Inventor
Paul C. Karlovich,

Oct. 10, 1950
P. C. KARLOVICH
2,525,225
DEVICE FOR MEASURING MATERIAL DISCHARGED
FROM A HOPPER FOR SACKING
Filed Dec. 1, 1944
2 Sheets-Sheet 2
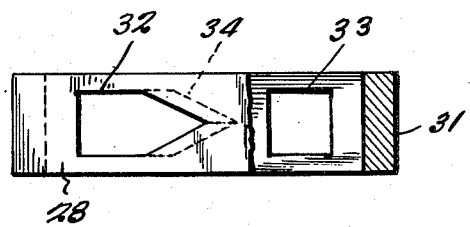
Fig. 3.
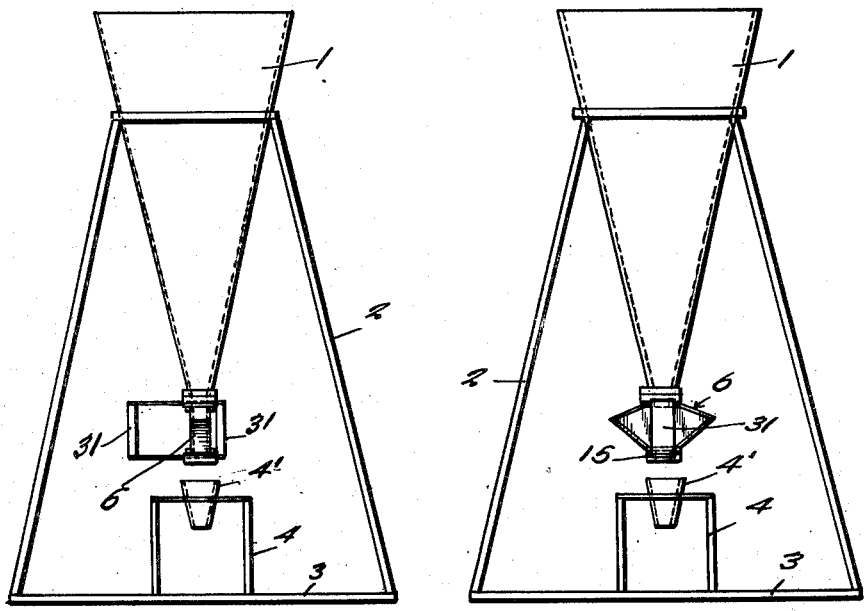
Fig. 4.
Fig. 5.
Inventor
Paul C. Karlovich,
By Clarence A. O'Brien
and Harvey B. Jacobson
Attorneys

Patented Oct. 10, 1950　　　　　　　　　　　　　　　　　　2,525,225

UNITED STATES PATENT OFFICE 2,525,225

DEVICE FOR MEASURING MATERIAL DISCHARGED FROM A HOPPER FOR SACKING

Paul C. Karlovich, Oklahoma City, Okla.

Application December 1, 1944, Serial No. 566,144

2 Claims. (Cl. 222—438)

My invention relates to improvements in measuring and sacking devices for sacking pre-measured quantities of beans or the like, the primary object in view being to provide a simple form of inexpensively constructed, labor-saving device for accurately measuring small quantities of beans in uniform lots and sacking the same, all by gravity feed, with a minimum of frictional resistance to such feed and without clogging of the device.

Other and subordinate objects also comprehended by my invention, together with the precise nature of my improvements and the advantages thereof will become apparent when the succeeding description and the claims are read with reference to the drawings accompanying and forming a part of this specification.

In said drawings—

Figure 1:
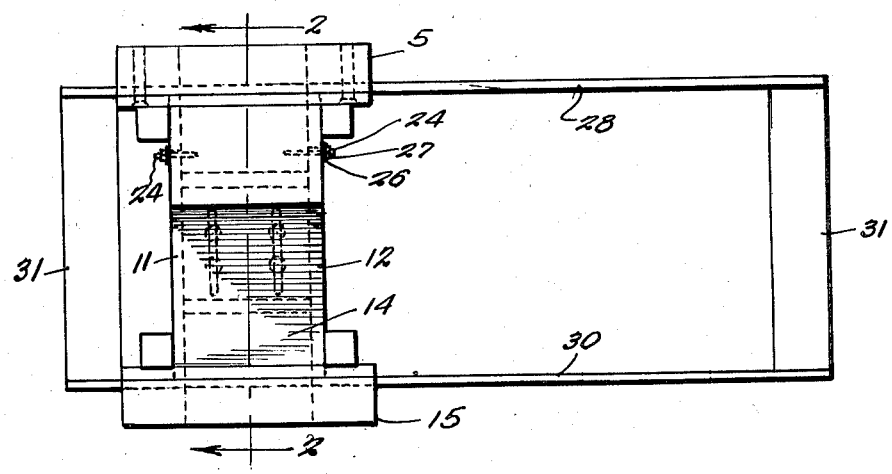
Figure 2:
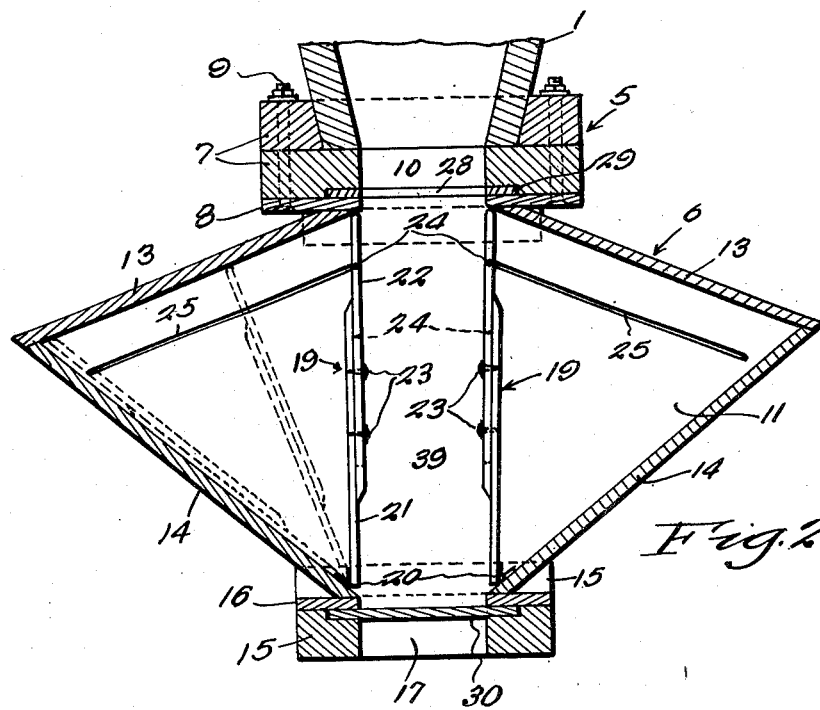

Figure 1 is a view in side elevation of the measuring bin and the combined feed and discharge control slide valve of my improved measuring and sacking device, Figure 2 is a view in vertical transverse section taken on the line 2—2 of Figure 1 and drawn to an enlarged scale, with a part of the feed hopper included, Figure 3 is a view in plan of the combined feed and discharge control slide valve partly broken away and drawn to a reduced scale, Figure 4 is a view in front elevation of the complete device drawn to a further reduced scale, and Figure 5 is a view in side elevation of the same.

Referring to the drawings by numerals, according to my invention a gravity feed supply hopper 1 for the beans is suitably supported in the top of a frame structure 2 of any suitable skeleton form and including a bottom 3. A receptacle 4 for a sack, not shown, and which may be of any suitable construction is imposed upon the bottom 3 in vertical alignment with the feed hopper 1. A funnel 4' of a suitable type for passing beans therethrough into a sack, not shown, in the receptacle 4 is provided in the top of said receptacle.

The lower discharge end of the feed hopper 1 is fixed in a skeleton head structure 5 of a measuring bin 6 depending therefrom, the structure 5, as shown, comprising crossed cleats 7 on a bottom panel 8, all secured together by bolts 9, the panel 8 being suitably apertured and the cleats 7 being arranged to provide a discharge throat 10 at the lower end of said hopper forming a continuation of said end.

The measuring bin 6 is provided with vertical, straight, front and rear sides 11, 12 substantially diamond shaped, a pair of top members 13 of flat form diverging downwardly from the bottom panel 8 and from opposite sides of the throat 10, and a pair of flat, bottom members 14 converging downwardly from the outer edges of the top members 13 to a skeleton bottom structure of crossed cleats 15 and an apertured panel 16 forming a discharge throat 17 at the bottom of said bin 6 which is of the same size as the discharge throat 10.

A pair of vertically elongated, endwise extensible, flaps 19 are suitably hinged, as indicated at 20, at the lower ends thereof to the lower edges of the bottom members 14 at opposite sides of the discharge throat 17, said flaps fitting edgewise in said bin 6 crosswise thereof and each being formed with a pair of flat lower and upper, overlapping sections 21, 22 slidably connected together by means of studs 23 extending through longitudinal slots 24 in the sections 22, said studs being anchored in the sections 21. Edge pins 24 on the upper flat sections 22 extend through and out of slots 25 formed in the sides 11, 12 of said bin 6 and inclined parallel with the top members 13. The pins 24 are equipped with suitable washers 26 and with nuts 27 outside the sides 11, 12. As best shown in Figure 2, the slots 25 are of sufficient length to permit the flaps 19 to be swung outwardly from vertical positions, in which the same are parallel with opposite sides of the throats 10, 17, until said flaps are positioned against the bottom members 14. Obviously, the pins 24 provide finger grips for swinging the flaps 19 into different positions, and the nuts 27 provide means for fixing said flaps in set positions.

A combined feed and discharge control slide valve is provided in conjunction with the foregoing and which comprises an elongated, rectangular upper slide 28, endwise slidable in the bin structure 5 across the discharge throat 10 transversely of the measuring bin 6, and in guideways 29, and a similarly shaped lower slide 30 similarly mounted in the described bottom structure to slide across the throat 17. A pair of upright handle-forming posts 31 connect the ends of said slides 28, 30 upon opposite sides of the measuring bin 6. A discharge aperture 32 is provided in the upper slide 28 adjacent one end thereof, and a rectangular discharge aperture 33 in the lower slide 30 adjacent the relatively opposite end thereof, the arrangement being such that said openings 32, 33 are staggered longitudinally of the valve for a purpose presently seen. Thus, when said valve is moved in one direction into one limit of movement, the throat 10 will be opened by the aperture 32 in the upper slide 28, and the throat 17 closed by the lower slide 30. Conversely, when said valve is moved into an opposite limit of movement, the throat 10 will be closed by the upper slide 28 and the throat 17 will be opened by the aperture 33 in the lower slide 30. The aperture 32 is substantially rectangular, in part, and of the same size, in part, as that of the throat 10 so as to completely open said throat 10, but, is provided with a converging end which is under-beveled, as represented at 34, to plow through beans in the throat 10 and prevent clogging of said throat when it is desired to close same.

Referring now to the use and operation of the invention, the described combined feed and discharge control slide valve is moved so that the upper slide 28 closes the discharge throat 10 and the lower slide 30 opens the discharge throat 17, in the manner already described. The hopper 1 is then filled with beans, not shown, and a sack, not shown, positioned in the receptacle 4 to be filled through the funnel 4'. With the flaps 19 swung into upright, parallel position and set in such positions by the nuts 27, said flaps 19 form together with the lower slide 30, when the latter is closed, a measuring pocket 39 of a minimum size. To fill the pocket 39, the combined feed and discharge control slide valve is moved to open the throat 10 and to close the throat 17, in a manner which will now be clear, the lower slide 30, in this operation, closing the bottom of the pocket. By moving said valve to open the throat 17 and close the throat 10, the measure in the pocket 39 may be released to discharge into the funnel 4' to fill the sack. By swinging the flaps 19 outwardly into different inclined positions, obviously the size of the measuring pocket 39 may be enlarged, and said pocket enlarged to accord with the maximum capacity of the measuring bin 6.

As will be seen, as the flaps 19 are swung, said flaps are extended, or contracted, depending upon the direction in which the same may be swung, and through the medium of the pins 24 and the slots 25, the upper ends of the upper sections 22 of said flaps 19 being slidably maintained in abutting relation to the top members 13 of said measuring bin. The advantage of this will be apparent. Since the flap sections 21, 22 are straight and flat, also the top members 13 of said bin 6 and the sides 11, 12 thereof, frictional resistance to discharge of the beans out of the measuring pocket 39 is reduced to a minimum. The sides 11, 12 of said bin 6 may be graduated along the slots 25 for establishing different settings of the flaps 19 so that the size of the measuring pocket 39 may be varied accurately to measure different quantities of beans as desired. Clogging of the device is positively prevented by the means previously described.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In a device for measuring material fed from a bottom outlet in a gravity feed hopper, a measuring bin having a centrally apertured top, sides and a bottom discharge throat and adapted to be attached at its top to said hopper to depend therefrom with said aperture registering with said outlet, a pair of opposed flaps in said bin having lower ends hinged thereto at opposite sides of said throat for swinging of the flaps toward and from each other into different set positions to form with said top and sides of the bin measuring pockets of different sizes communicating with said aperture and throat, said flaps each comprising a pair of upper and lower sections, the upper sections in the pairs being slidably mounted on the lower sections for extension and contraction of said flaps and being provided with upper ends having free constant sliding engagement with said top, and means for causing sliding of said upper sections on the lower sections as an incident to swinging of said flaps.

2. In a device for measuring material fed from a bottom outlet in a gravity feed hopper, a measuring bin having a centrally apertured top, sides, and a bottom discharge throat and adapted to be attached at its top to said hopper to depend therefrom with said aperture registering with said outlet, a pair of opposed flaps in said bin having lower ends hinged thereto at opposite sides of said throat for swinging of the flaps toward and from each other into different set positions to form with said top and sides of the bin measuring pockets of different sizes communicating with said aperture and throat, said flaps each comprising a pair of upper and lower sections, the upper sections in the pairs being slidably mounted on the lower sections for extension and contraction of said flaps and being provided with upper ends having free constant sliding engagement with said top, and means for causing sliding of said upper sections on the lower sections as an incident to swinging of said flaps comprising pins on said upper sections, said sides of the bin having slots therein parallel with said top and in which said pins are slidable along the same.

PAUL C. KARLOVICH.

REFERENCES CITED

The following references are of record in the file of this patent:

UNITED STATES PATENTS

| Number | Name | Date |
| --- | --- | --- |
| 134,928 | Price et al. | Jan. 14, 1873 |
| 346,718 | Capewell | Aug. 3, 1886 |
| 363,849 | Richardson | May 31, 1887 |
| 547,848 | Davis | Oct. 15, 1895 |
| 616,316 | Haddox | Dec. 20, 1898 |
| 1,287,023 | Hornung | Dec. 10, 1918 |
| 1,417,040 | De Fouconpret | May 23, 1922 |
| 1,540,165 | Cytron | June 2, 1925 |
| 1,615,438 | Bott | Jan. 25, 1927 |
| 1,764,327 | Madsen | June 17, 1930 |
| 1,810,772 | Lassen | June 16, 1931 |
| 1,891,038 | Barros | Dec. 13, 1932 |
| 2,070,096 | Smith | Feb. 19, 1937 |
| 2,155,336 | Smith | Apr. 18, 1939 |